United States Patent [19]

Borbas et al.

[11] Patent Number: 5,060,256
[45] Date of Patent: Oct. 22, 1991

[54] MASS POLLING SYSTEM WITH CUT-THROUGH

[75] Inventors: William Borbas, Woodridge; Robert W. Walker, Glen Ellyn, both of Ill.

[73] Assignee: Illinois Bell Telephone Company, Chicago, Ill.

[21] Appl. No.: 514,708

[22] Filed: Apr. 26, 1990

[51] Int. Cl.$^5$ .......................................... H04M 11/00
[52] U.S. Cl. ........................................ 379/92; 379/70
[58] Field of Search ................... 379/92, 67, 70, 74, 379/77, 84, 97, 88

[56] References Cited

U.S. PATENT DOCUMENTS

| | | | |
|---|---|---|---|
| 4,290,141 | 9/1981 | Anderson et al. | 379/92 |
| 4,303,804 | 12/1981 | Johnson et al. | 379/92 |
| 4,794,633 | 12/1988 | Barbas et al. | 379/92 |
| 4,845,739 | 7/1989 | Katz | 379/92 |
| 4,926,255 | 5/1990 | Von Kohorn | 379/92 |

Primary Examiner—Jin F. Ng
Assistant Examiner—Ahmad F. Matar
Attorney, Agent, or Firm—Willian Brink Olds Hofer Gilson & Lione

[57] ABSTRACT

A mass polling system with cut-through capabilities is provided. The mass polling system is of the type which includes circuitry for switching calls to a selected telephone number to at least one trunk and means for tabulating the number of calls to the selected telephone number. A recorded message is presented to the majority of the callers responding to the mass polling question. The mass polling system further includes a cut-through circuit which enables the poll sponsor to randomly talk to callers responding to the question presented.

8 Claims, 5 Drawing Sheets

FIG_3

MASS POLLING SYSTEM WITH CUT-THROUGH

BACKGROUND OF THE INVENTION

The present invention relates generally to a mass polling system and more particularly to a mass polling system which provides a poll sponsor the ability to selectively interact with respondents.

Mass polling systems are telephone systems in which a number of incoming calls to a selected telephone number are tabulated and typically a recorded message is presented to each caller or respondent. Mass polling systems may be used to register public response to a selected question. For example, a television program (the poll sponsor) can present an issue or question of public interest, and invite members of the public to respond by calling a first number to register an affirmative response and a second, separate telephone number to register a negative response to the question. Callers or respondents call one or the other of the two numbers, depending on their position on the question. Automatic equipment then registers the total number of calls to each of the telephone numbers, thereby indicating the public's affirmative and negative response to the question presented. Other examples of the use of mass polling systems are in sporting events where the public or fans are invited to select or vote for a particularly favorite player.

In some mass polling systems (such as the one provided by AT&T) calls are routed from the originating central office over trunks to toll machines. The toll machines present a recorded answer to each call, generate a charge record which causes the caller to be billed for the call, and tabulate the number of calls answered at each number.

Another improved mass polling system is disclosed in U.S. Pat. No. 4,794,633 (Borbas et al.). The system disclosed in this reference is for a mass polling system with an improved procedure for the manner in which the charge record and charge signals are generated and used.

Although these available systems provide means through which the response to a given question can be tabulated, there is no means provided in these available systems for the poll sponsor to have an interviewer verbally communicate with the respondents. Having this ability would be useful in television or radio programs, such as talk shows. Here, in addition to having the tabulated responses, it would be advantageous to be able to selectively confer with respondents in at least one of groups responding. This would make the program more interesting by providing viewers or listeners a more detailed answer to the question or issue presented.

Although some interactive telephone response systems are available, none provide the sponsor of a mass polling system with the ability to communicate with selected ones of the persons responding to the question presented. For example, U.S. Pat. No. 4,594,476 (Freeman) discloses an interactive broadcast system for use with a telephone interrogation system. The system disclosed by Freeman utilizes prerecorded data stored on various channels of multi-track tape deck. Different messages are broadcast based upon various audio responses.

U.S. Pat. No. 4,599,493 (Cave) discloses an automated telephone calling system which receives a group of telephone numbers from a host computer. Each telephone number is associated with a corresponding record of unique information. Each number is automatically called and equipment provides detection of rings, busy signals, recordings and voice answers. If a party answers a call, the called line is connected to a nonbusy one of the group of operators. At the same time, a report is sent from a central controller to the host computer indicating which number has been successfully called and which operator has been selected for audio connection. The host computer then calls up the record for the called number and transmits at least a portion of the record to the display for the selected operator. The operator is provided with an audio connection to the called party as well as a screened display of relevant information for that party.

As discussed above, these available systems do not provide the ability for the sponsor of a mass poll to talk directly to respondents.

Therefore, in view of the above it is an object of the present invention to provide a mass polling system which provides the poll sponsor with the ability to selectively confer with a responder to the question presented by the poll.

The invention itself, together with further objects and attendant advantages, will best be understood by reference to the following detailed description, taken in conjunction with the accompanying drawings.

SUMMARY OF THE INVENTION

To achieve the foregoing and other objects and in accordance with the purposes of the present invention, the mass polling system of the present invention provides an arrangement which permits the poll sponsor to selectively confer with poll responders. The system includes means for switching calls for a selected telephone number to at least one trunk and means for tabulating calls to the selected telephone number. A recorded message is presented to most of the callers at the selected telephone number. Means are provided for selectively enabling an interviewer of the poll sponsor to communicate with one of the callers to the selected telephone number.

DETAILED DESCRIPTION OF THE PRESENTLY PREFERRED EMBODIMENTS

Figure 1:
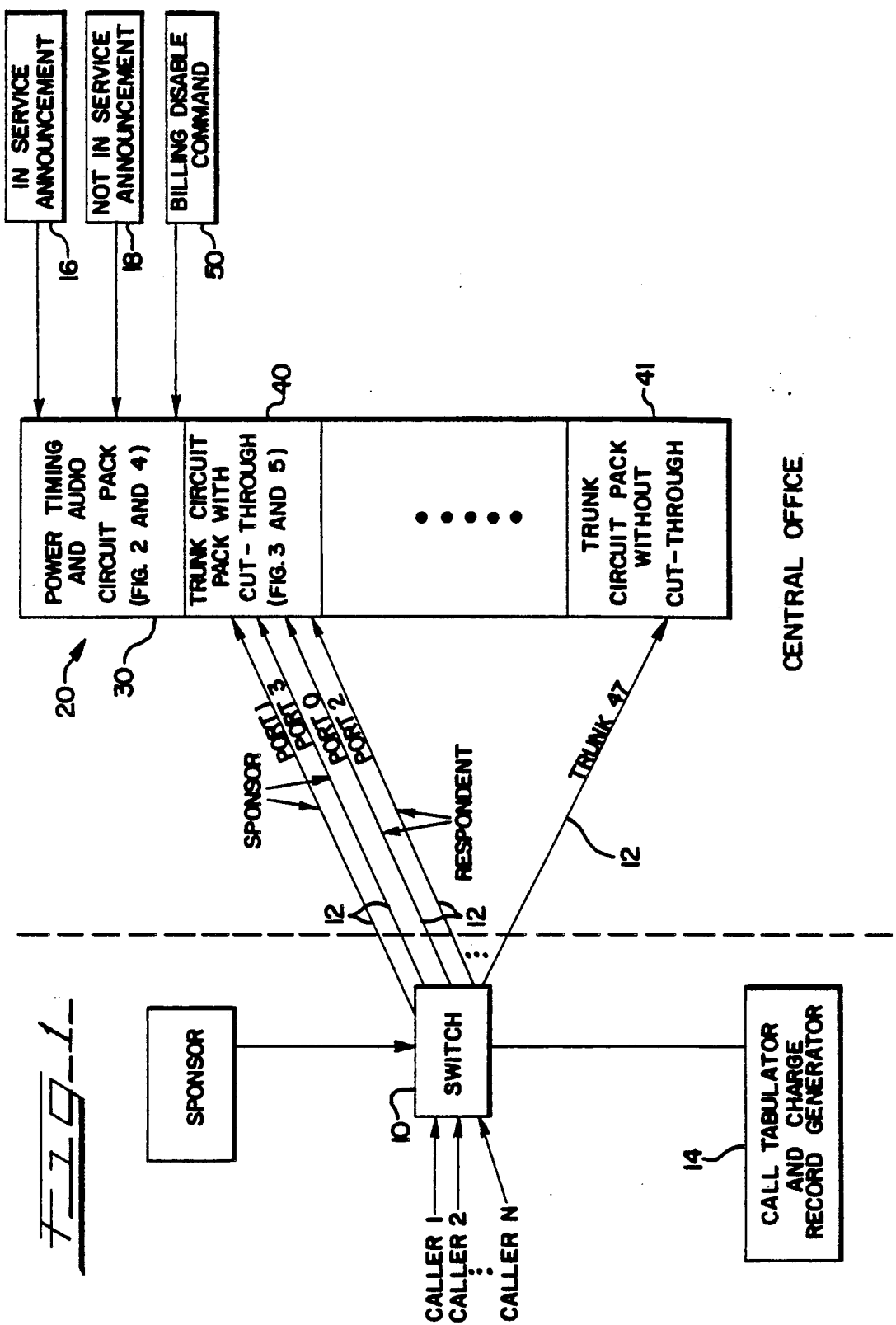
FIG. 1 is a block diagram of a preferred embodiment the mass polling system of the present invention.

Referring now to the drawings, and specifically to FIG. 1, a block diagram of the mass polling system which incorporates the presently preferred embodiment of this invention is illustrated. The present invention is implemented in the power, timing, and audio circuit 30 and the trunk circuit 40. The remaining portions of FIG. 1 are provided merely to define the environment of this invention.

As illustrated in FIG. 1, incoming calls for a given mass polling telephone number are routed via a conventional switch 10 to one of a plurality of trunks 12. In the illustrated embodiment 48 separate trunks 12 are provided. In this preferred embodiment, two of the trunks 40 are provided with cut-through for the respondent, two of the trunks 40 are provided for the sponsor, and forty-four trunks 41 without cut-through are provided for normal polling. The design of the circuits for the trunk without cut-through are described in detail in U.S. Pat. No. 4,794,633 (Borbas et al.) which is incorporated herein by reference. It is to be understood that a larger or smaller number of trunks can be provided in alternative embodiments.

The switch 10 directs incoming calls to any available one of the trunks 12. Each of the trunks 12 terminate at a respective one of the trunk circuits 40 or 41. A call tabulator and charge record generator 14 monitors the activity on each of the trunks 12. Conventional call tabulator and charge generator means are used for recording the total number of calls handled on the trunks 12 and for generating a charge record for each of the handled trunks 12 in response to battery reversal on the trunk. The detailed structure and operation of the call tabulator and charge record generator 14 does not per se form part of this invention and therefore is not described in any greater detail here.

The embodiment of FIG. 1 also includes an in-service announcement system 16 and a not-in-service announcement system 18. These two systems 16 and 18 are conventional devices for playing back prerecorded messages. The prerecorded messages may be, for example, of a duration between 1 and 99 seconds. A suitable playback system is model 13A manufactured by Western Electric. The devices for playing back such messages are well known to those skilled in the art and therefore are not described in any more detail here.

Figure 2:
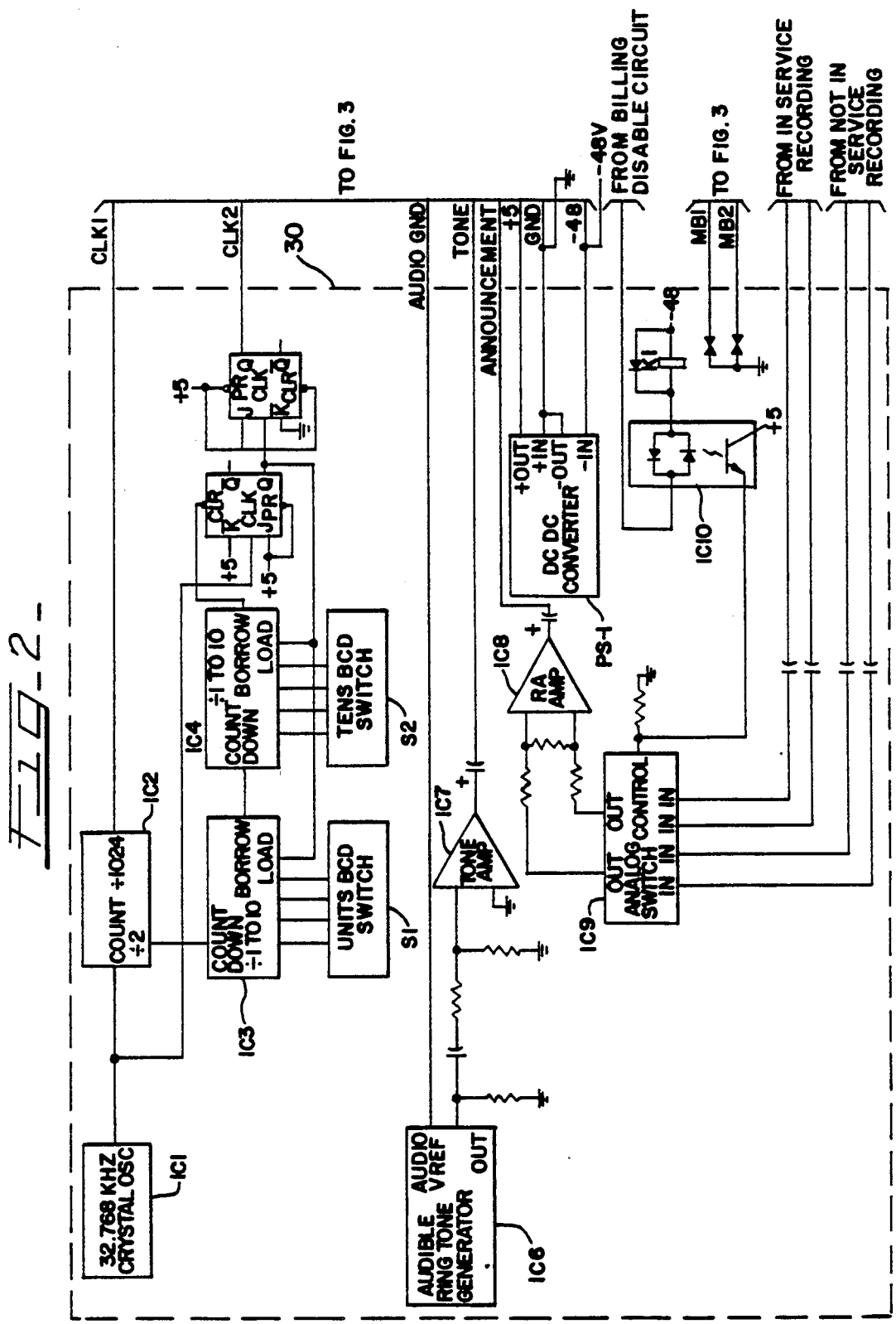
FIG. 2 is a block diagram of a preferred embodiment of the power, timing, and audio circuit of the present invention.

Referring now to FIG. 2, a detailed description of the circuitry of the power, timing and audio circuit 30 is illustrated. The circuit 30 receives audio inputs from the in-service recording system 16 and from the not-in-service recording system 18. In addition, the power, timing, and audio circuit receives control signals from a billing disabled circuit 50 of −48 volt and ground.

The power, timing, and audio circuit 30 includes a crystal oscillator IC1 which supplies a periodic signal to a counter IC2 that generates a first clock signal CLK1 preferably at 32 Hz. In addition, a counter IC2 divides the clock signal by two and provides the divided clock signal to a counter system which comprises counters IC3 and IC4. Each of the counters IC3 and IC4 is preferably a divide by 1-10 counter.

The operation of the counters IC3, and IC4 is controlled by respective BCD switches S1 and S2. The switches S1 and S2 can be manually set to any value between 1 and 99 in order to alter the frequency of the resulting second clock signal CLK2 to any value between 8192 and 82.75 Hz. The clock signals, CLK1 and CLK2, are used by the trunk 40 as described in more detail below.

The power, timing and audio circuit 30 also includes an audible ring tone generator IC6 which supplies an audio ground as well as a ring tone signal that is amplified by an amplifier IC7 and supplied as an output signal. The tone amplifier IC7 allows the amplitude of the tone signal to remain constant under varying loads.

The power, timing and audio circuit 30 also includes a power supply PS-1 which includes a DC to DC converter for converting the −48 volt input to a +5 volt signal which is used to power the logic circuits in the circuits 30 and 40.

The audio signals from the in-service recording system 16 and the not-in-service recording system 18 are applied to respective inputs of an analog switch IC9. The analog switch IC9 selects one of the two sets of inputs to be passed to a recorded announcement amplifier IC8. The output of the recorded announcement amplifier IC8 is supplied as an announcement output signal.

The control signal from the billing disable circuit 50 is preferably a two-state signal which controls the analog switch IC9 via an opto-isolator IC10 included in the integrated circuit. Thus, the state of the control signal received from the billing disable circuit 50 determines whether the analog switch IC9 passes the in-service recording or the not-in-service recording to the recorded announcement amplifier IC8. In addition, the control signal from the billing disable circuit 50 controls a relay K1. The contacts of the relay K1 are normally open, thus isolating the lead MB1 and MB2 from ground. However, when the control signal from the billing disable circuit 50 energizes the relay K1, the normally open contacts are closed, thus connecting the terminal MB1 and MB2 to ground.

Figure 3:
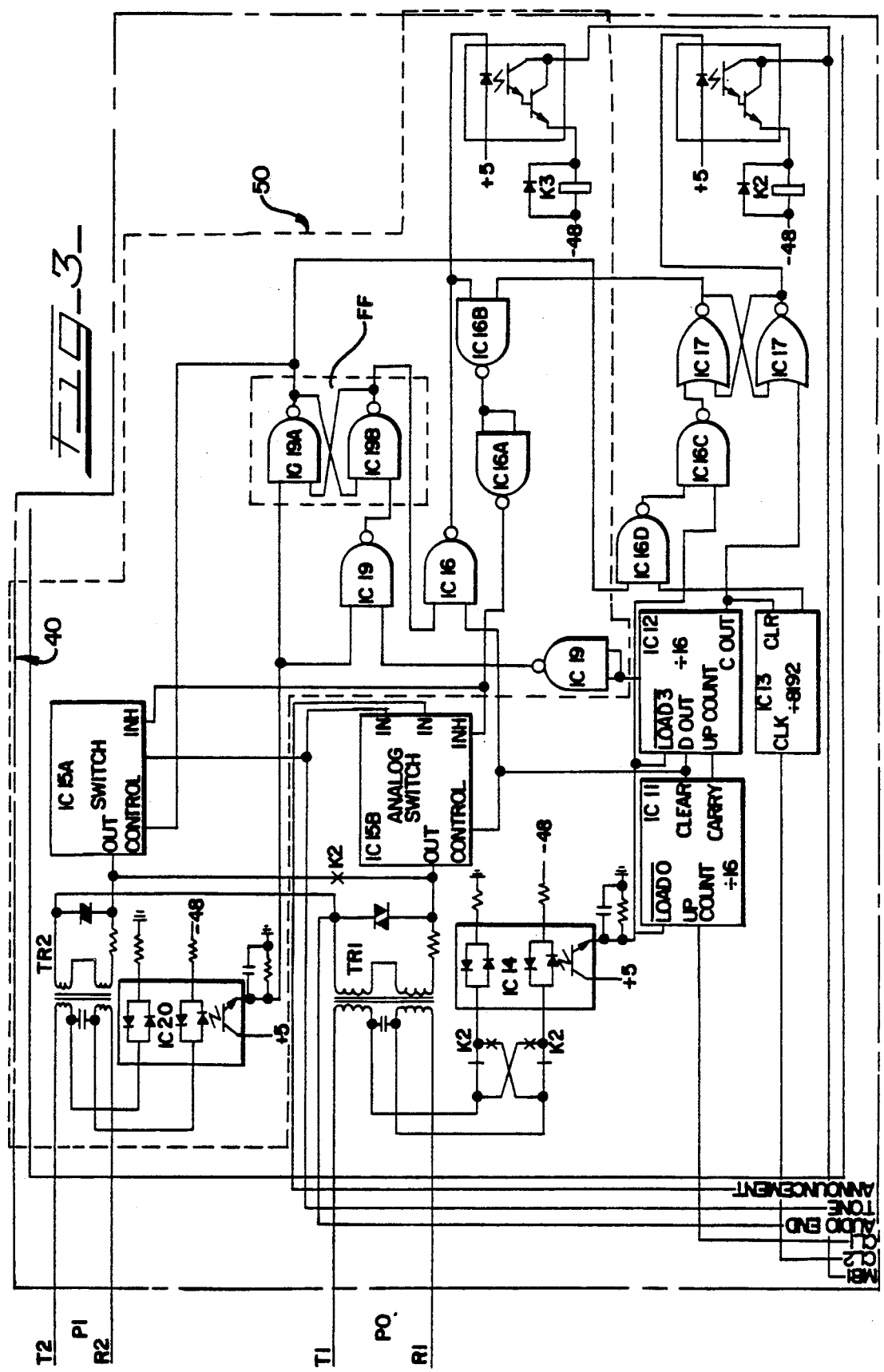
FIG. 3 is a block diagram of a preferred embodiment of the trunk circuit used in the present invention.

Referring now to FIG. 3, a block diagram of a portion of one of the trunk circuits 40 with the cut through circuit is illustrated. The trunk circuit contains two incoming trunks and two cut-through ports. For example, port 0 (P0) and port 2 (P2) may be incoming trunks and port 1 (P1) and port 3 (P3) may be for cut-through access from the sponsor. For purposes of illustrations, the circuit illustrated in FIG. 3 only shows the circuitry used for two ports, P0 and P1. It will be apparent that the circuitry for the other two ports, P2 and P3 is similar and therefore only ports P0 and P1 are illustrated and described in detail here.

The circuit of FIG. 3 includes a transformer TR1 which is coupled to the tip and ring leads T1 and R1 of the respective trunk 12. The tip and ring leads T1 and R1 are connected via the transformer TR1, K2 relay contacts, and a sensor IC14 to −48 volts and ground, respectively, when the relay K2 is not energized. An analog switch IC15B receives respective inputs from the tone and announcement outputs of the circuit 30. The analog switch IC15B selects one of these two inputs to be applied via the transformer TR1 to the trunk 12.

In operation, when the sponsor has not attempted to talk to one of the respondents, the sensor IC14 senses when the trunk 12 is seized by an incoming call. The circuit of FIG. 3 also includes a pair of counters IC11 and IC12. The counter IC11 is responsive to CLK1 and the counter IC12 is responsive to the carry output of the counter IC11. When the sensor IC14 detects a seizure, the counters IC11 and IC12 are released. After 16 pulses of CLK1 (500 msec) the "C" output of the counter IC12 causes the relay K2 to be energized. When energized, the relay K2 reverses the battery and ground connection to the originating trunk 12 and releases the inhibit control to the analog switch IC15B in order to cause the audible ring signal to be passed via the analog switch IC15B to trunk 12. Two seconds later, the "D" output of the counter IC12 causes the analog switch IC15B to stop passing the ring signal to the trunk 12 and begin passing the announcement to the trunk 12. The "C" output of the counter IC12 enables a counter IC13 and counts clock pulses CLK2. After 8192 cycles of CLK2 have been counted, the counter IC13 releases the relay K2 and inhibits the analog switch IC15B from transmitting either the ring signal or the announcement to the trunk 12.

If the sponsor attempts to talk to one of the respondents, the sensor IC20 detects a seizure which removes the reset from F/F IC19A and 19B. When the other port is idle F/F IC19A and 19B will set. This action places the circuit 50 in the standby mode. The next respondent will be connected to the poll sponsor through relay K3 after both the respondent and the poll sponsor receive 2-seconds of audible ring tone.

The input MB1 enables or disables the relay K3. In the event the input MB1 is not grounded, the relay K3 cannot be energized and the polarity on the trunk 12 cannot be reversed.

Figure 4:
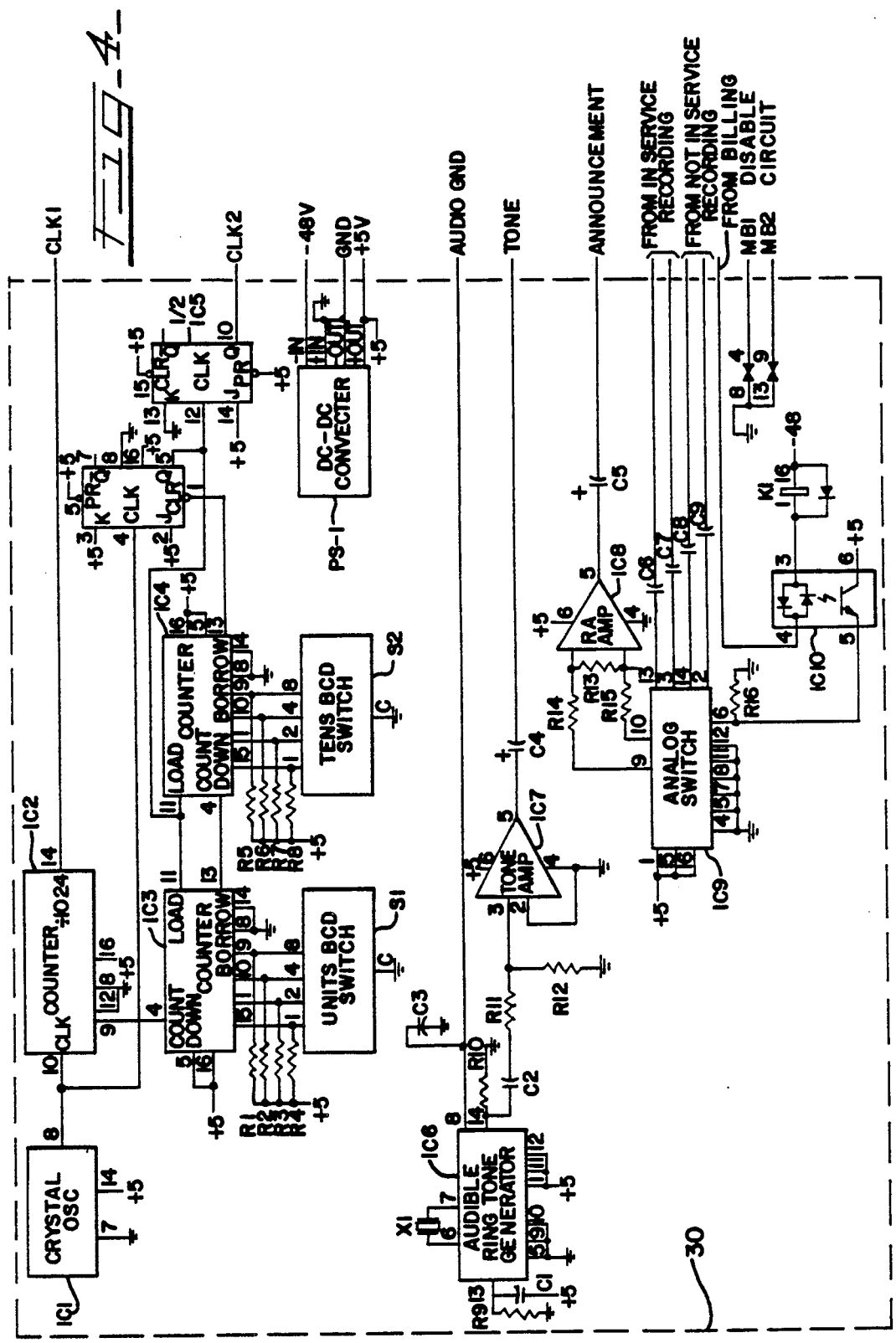
FIG. 4 is a detailed schematic diagram of the power, timing, and audio circuit of FIG. 2.
Figure 5:
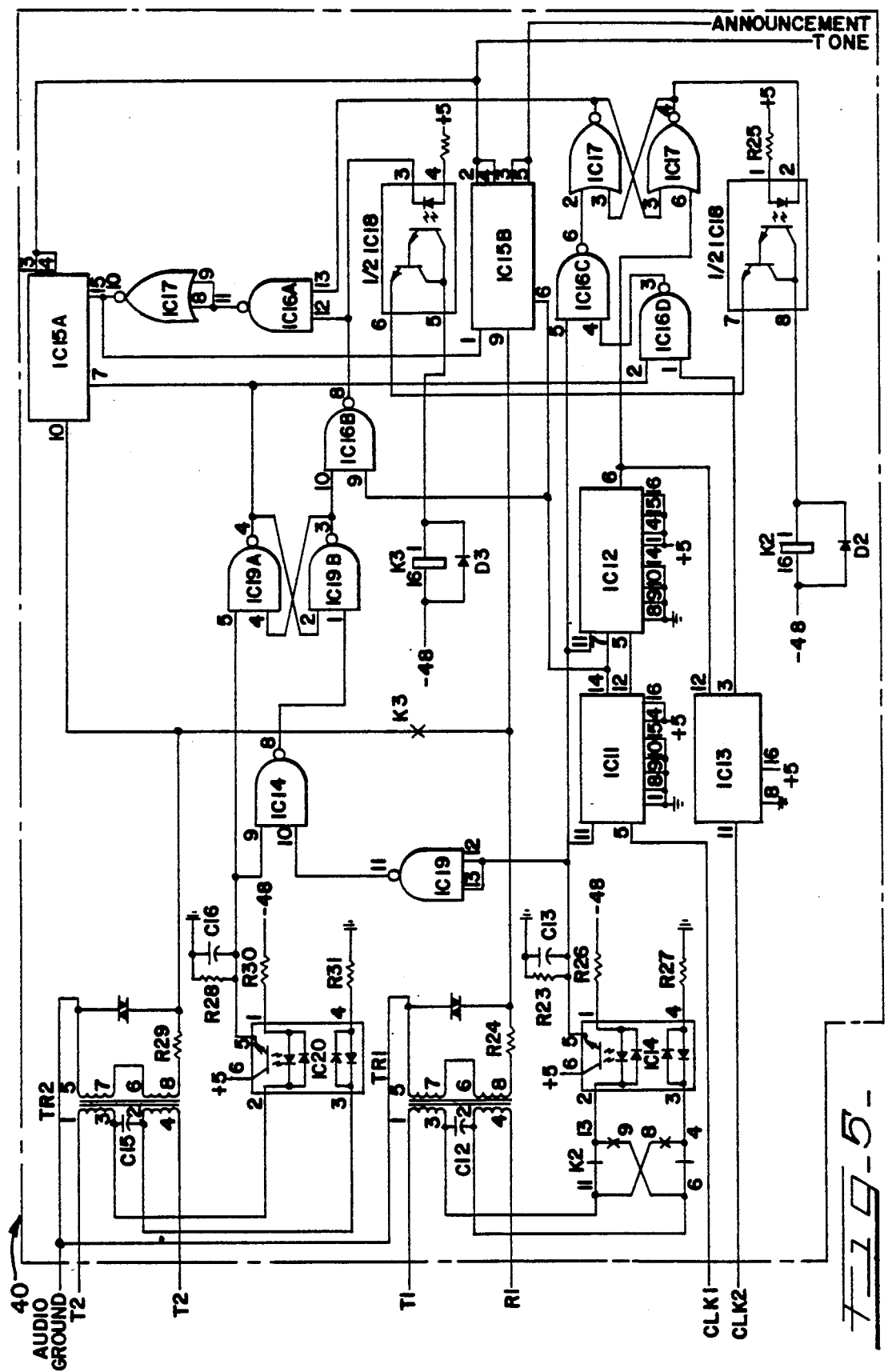
FIG. 5 is a detailed schematic diagram of the trunk circuit illustrated in FIG. 3.

FIGS. 4 and 5 provide detailed schematic diagrams of the circuits of FIGS. 2 and 3, respectively. Tables 1 and 2 identify the circuit components used in FIGS. 4 and 5, respectively for this preferred embodiment.

TABLE 1

| | DESCRIPTION |
|---|---|
| CAPACITOR DESIG | |
| C1 | IMF CER |
| C2, C6, C7, C8, C9 | 47 MF CER |
| C3 | 1000 MF 16 V |
| C4, C5, | 250 MF 16 V |
| CRYSTAL DESIG | |
| X1 | 3.579 MHZ |
| POWER SUPPLY DESIG | |
| PS1 | PM-741 PACKAGED POWER |
| RESISTOR DESIG | |
| R1-R8, R11 | 47K ¼ W |
| R9, R12 | 15K ¼ W |
| R10 | 1K ¼ W |
| R13, | 5600 ¼ W |
| R14, R15, | 12000 ¼ W |
| R16 | 5.6K |
| SWITCH DESIG | |
| S1-S2 | P1CO-137-AK ALCO SWITCH |
| INTEGRATED CIRCUITS DESIG | |
| IC1 | 32.768 KHZ OSC |
| IC2 | 74HC4020 |
| IC3-IC4 | 74HC192 |
| IC5 | 74HC109 |
| IC6 | M-991 TELETONE CORP. |
| IC7, IC8 | LM 386 |
| IC9 | CD4529B |
| IC10 | LDA200 THETA-J CORP. |
| RELA. DESIG | |
| K1 | RZ-48 |
| DIODE DESIG | |
| D1 | IN4004 |

TABLE 2

| | DESCRIPTION |
|---|---|
| CAPACITOR DESIG | |
| C12 | 2 MF |
| C13 | 1 MF TANT |
| C15 | 2 MF |
| C16 | IMF TANT |
| INTEGRATED CKT DESIG | |
| IC11 | 74HC193 |
| IC12 | 74HC193 |
| IC13 | 74HC4060 |
| IC14 | LDA-200 THETA-J CORP. |
| IC15 | CD45298 |
| IC16 | 74HC00 |
| IC17 | 74HC02 |
| IC18 | 2B OPTO ISOLATOR WECO |
| IC19 | 74HC00 |
| IC20 | LDA-200 THETA-J CORP. |
| DIODE DESIG | |
| D2 | 533F WECO |
| D3 | 533F WECO |
| RESISTOR DESIG | |
| R23 | 56K ¼ W |
| R24 | 1K ¼ W |
| R25 | 1K ¼ W |
| R26 | 1K 2 W |
| R27 | 1K 2 W |
| R28 | 56K ¼ W |
| R29 | 1K ¼ W |
| R30 | 1K 2 W |
| R31 | 1K 2 W |
| TRANSFORMER DESIG | |
| TR1 | 2586H |
| TR2 | 2586H |
| RELAY DESIG | |
| K2 | RZ-48 |
| K3 | RZ-48 |

The power, timing and audio circuit 30 provides a 5 volt signal, clock signals CLK1, and CLK2, control signal MB1 and MB2 and tone and announcement signal distribution for up to 48 trunk circuits. The DC-DC converter PS-1 is used provide a the five volt signal from the −48 volts. The two clock signals CLK1 and CLK2 provide the timing required for trunk control. CLK1 controls the 500 millisecond delay after seizure before the relay K2 is energized, and the two second period during which the audible ring signal is provided to the outgoing trunk. CLK2 controls the length of the recorded announcement. The frequency of the clock signal CLK2 is controlled by the BCD switches S1 and S2. The control signal from the billing disable circuit 15 isolates the terminal MB1 and MB2 from ground and switches the not-in-service announcement to the recorded announcement amplifier IC8.

The audible ring signal is provided by a single integrated audible ring tone generator IC6 and is equalized for distribution to the trunk circuits 40. The recorded announcement presented on the announcement terminal is also equalized for distribution by means of the amplifier IC8.

The sensor IC14 of the trunk circuit of FIG. 3 monitors the outgoing trunk circuit 12 for seizure. When the outgoing trunk 12 is seized, the sensor IC14 releases the counters IC11 and IC12. This causes the ring signal to be presented to the outgoing trunk 12 after delay of 500 milliseconds. The ring signal is presented to the outgoing trunk 12 for a total of two seconds, and then the recorded announcement on the announcement terminal is presented to the outgoing trunk for a time period as determined by the switches S1 and S2. In the event the MB1 terminal is grounded, the relay K2 reverses polarity on the trunk 12 simultaneously with the first presentation of a ring signal to the trunk 12. After the timer IC13 has timed out the relay K2 is released, thereby transmitting an on-hook signal via the trunk 12.

If the sponsor attempts to talk to one of the respondents, IC20 detects a seizure and after the caller which is presently on the line disconnects, a flip-flop IC19A and IC19B is set. This enables analog switch IC15A and inhibits IC16D which disables the timed disconnect of calls on the incoming trunk port. In this condition, a seizure detected by IC14 will release counter IC11 and IC12. After 500 milliseconds, an audible ring will be turned on, since switch IC15A is enabled. Both the next caller and the sponsor will hear the audible ring. Two seconds later, both analog switches IC15A and IC15B are inhibited by the output of IC16A and IC16B and relay K3 is operated establishing a transmission path linking the caller and the sponsor. The caller and the sponsor will remain linked until one of them disconnects. Preferably the sponsor may remain connected and be linked to the next caller.

Battery and ground for P0 (and port P2) is provided through current limiting resistors R26 and R27, current detector IC14, the contacts of relay K2, and the transformer TR1. Battery and ground for port P1 (and port P3) is provided through resistors R30 and R31 current detector IC20 and transformer TR2.

The cut-through capability of the trunk and cut-through circuit 40 provides the poll sponsor with the ability to selectively talk directly to callers. In this manner, the poll sponsor may get more in depth understanding on their position on specific issue presented. This capability may provide some entertainment value if the sponsor is being watched such as in a television show or heard such as on a radio talk show.

The system is configured such that the sponsor has the ability to talk to callers in different areas or neighborhoods depending on the switch to which the sponsor connects. For example, the interviewer for the poll sponsor may wish to interview only callers from one area code or callers from one area code with a specific exchange. The interviewer may also limit the persons interviewed to persons with a specific response (i.e. a yes vote or a no vote).

Of course, it should be understood that a wide range of changes and modifications can be made to the preferred embodiments described above. It is therefore intended that the foregoing detailed description be regarded as illustrative rather than limiting, and that it be understood that it is the following claims, including all equivalents which are intended to define the scope of the invention.

We claim:

1. A telephone mass polling system for a pool sponsor to present an issue and a plurality of respondents to respond by dialing a first predetermined telephone number for a first answer and a second predetermined telephone number for a second answer comprising:
   means for switching calls for said first predetermined telephone number and said second predetermined telephone number to at least one trunk;
   said at least one trunk including:
   a) circuit means for tabulating calls to said first predetermined telephone number and said second predetermined telephone number;
   b) means for presenting respondents dialing said first predetermined telephone number and said second predetermined telephone number with a recorded message; and
   c) means for enabling the poll sponsor to selectively talk with one of the respondents dialing one of said first predetermined telephone number and said second predetermined telephone number.

2. The mass polling system of claim 1 wherein the means for enabling the sponsor to talk to one of the respondents comprises means for detecting an incoming call to the trunk from the sponsor and means for linking the call from the sponsor to the call from the respondent.

3. The mass polling system of claim 2 wherein the means for connecting the sponsor to the respondent further comprises means for disconnecting the line to the recorded message and connecting a transmission path between the sponsor and the respondent.

4. The mass polling system of claim 1 further comprising means for providing an audible-ring to the poll-sponsor and the one of the respondents.

5. A telephone mass polling system for a sponsor to present an issue and a plurality of respondents to respond by dialing a predetermined telephone number comprising:
   means for switching telephone calls from respondents to a selected telephone number to at least one trunk;
   means for tabulating calls to said selected telephone number;
   message means for presenting respondents calling said selected telephone number with recorded message;
   a first port for receiving incoming calls from the sponsor of the poll;
   a second port for receiving a call from a respondent;
   a means for selectively providing a two-way transmission path between the second port and one of the first port and the means for presenting the message means.

6. The mass polling system of claim 5 wherein the means for selectively providing a two-way transmission path comprises a cut-through circuit including means for:
   monitoring the input for a seizure indicating a call from the sponsor, controlling and disconnecting the recorded message to the second port and a relay which provides a two-way transmission path between the first and the second ports.

7. The mass polling system of claim 6 further including circuit means for providing an audible ring to both ports upon the sponsor initiating a call to one of the ports.

8. The mass polling system of claim 5 further comprising means for providing an audible ring to said two way transmission path.

* * * * *

UNITED STATES PATENT AND TRADEMARK OFFICE
CERTIFICATE OF CORRECTION

PATENT NO. : 5,060,256
DATED : October 22, 1991
INVENTOR(S) : William Borbas et al.

It is certified that error appears in the above-indentified patent and that said Letters Patent is hereby corrected as shown below:

On the Title Page, Item [56], under "U.S. PATENT DOCUMENTS", delete "Barbas" and substitute therefor --Borbas--.

In column 6, line 32, after "used" insert --to--.

Column 7, Line 48, before "sponsor" delete "pool" and substitute therefor --poll--.

Signed and Sealed this

Nineteenth Day of April, 1994

BRUCE LEHMAN

*Attest:*

*Attesting Officer*　　*Commissioner of Patents and Trademarks*